United States Patent
He et al.

(10) Patent No.: US 12,112,663 B2
(45) Date of Patent: Oct. 8, 2024

(54) BOUNDARY SMOOTHING IN A DISPLAY

(71) Applicant: Apple Inc., Cupertino, CA (US)

(72) Inventors: Juan He, San Jose, CA (US); Yi Huang, San Jose, CA (US); Jun Qi, San Jose, CA (US); ByoungSuk Kim, Palo Alto, CA (US); Hao Chen, Santa Clara, CA (US); Ping-Yen Chou, Santa Clara, CA (US); Yi-Pai Huang, Zhubei (TW); Yue Ma, Sunnyvale, CA (US); Sheng Zhang, San Jose, CA (US)

( * ) Notice: Subject to any disclaimer, the term of this patent is extended or adjusted under 35 U.S.C. 154(b) by 0 days.

(21) Appl. No.: 18/165,648

(22) Filed: Feb. 7, 2023

(65) Prior Publication Data

US 2023/0326380 A1    Oct. 12, 2023

Related U.S. Application Data

(63) Continuation of application No. PCT/US2021/044211, filed on Aug. 2, 2021.

(60) Provisional application No. 63/067,252, filed on Aug. 18, 2020.

(51) Int. Cl.
G09G 3/00    (2006.01)

(52) U.S. Cl.
CPC .............. *G09G 3/001* (2013.01); *G09G 3/03* (2020.08); *G09G 2320/02* (2013.01); *G09G 2320/041* (2013.01); *G09G 2320/0626* (2013.01)

(58) Field of Classification Search
CPC ... G09G 3/001; G09G 3/02; G09G 2320/0626
See application file for complete search history.

(56) References Cited

U.S. PATENT DOCUMENTS

| | | | |
|---|---|---|---|
| 7,375,886 B2 | 5/2008 | Lipton et al. |
| 7,525,541 B2 | 4/2009 | Chun et al. |
| 7,671,889 B2 | 3/2010 | Lipton et al. |
| 8,284,204 B2 | 10/2012 | Kalaiah et al. |
| 8,531,451 B2 | 9/2013 | Mital et al. |
| 8,750,599 B2 | 6/2014 | Godar |

(Continued)

FOREIGN PATENT DOCUMENTS

| | | |
|---|---|---|
| EP | 2509065 A1 | 10/2012 |
| JP | 2012249060 A | 12/2012 |

(Continued)

*Primary Examiner* — Ariel A Balaoing
(74) *Attorney, Agent, or Firm* — Treyz Law Group, P.C.; Joseph F. Guihan; Jinie M. Guihan

(57) ABSTRACT

An electronic device may include a lenticular display. The lenticular display may have a lenticular lens film formed over an array of pixels. The lenticular lenses may be configured to enable stereoscopic viewing of the display such that a viewer perceives three-dimensional images. To mitigate jaggedness in a curved edge of the active area, control circuitry may modify input pixel data for the display using dimming factors. Each brightness value of the pixel data may be multiplied by a corresponding dimming factor such that the curved edge has a smooth appearance. Each physical pixel in the display may have an associated perceived pixel that is based on an appearance of that physical pixel through the lenticular lens film. The perceived pixel may have a different footprint than its corresponding physical pixel. The dimming factors for boundary smoothing in the curved edges may be based on the perceived pixels.

21 Claims, 14 Drawing Sheets

(56) References Cited

U.S. PATENT DOCUMENTS

| | | |
|---|---|---|
| 8,823,890 B2 | 9/2014 | Sekine |
| 9,143,770 B2 | 9/2015 | Bennett et al. |
| 10,157,448 B2 | 12/2018 | Nguyen et al. |
| 10,241,342 B2 | 3/2019 | Wei |
| 10,551,913 B2 | 2/2020 | McCombe et al. |
| 2003/0163367 A1* | 8/2003 | Piepel ............... G09F 19/18 705/14.34 |
| 2004/0085477 A1* | 5/2004 | Majumder ......... H04N 9/3194 348/383 |
| 2007/0035707 A1* | 2/2007 | Margulis ............ H04N 9/312 353/122 |
| 2008/0119583 A1* | 5/2008 | Jones ................ G02B 6/0053 362/311.06 |
| 2009/0073556 A1 | 3/2009 | Bent-Gourley |
| 2009/0155759 A1* | 6/2009 | Hayashi ............... B43L 1/04 434/408 |
| 2010/0309298 A1* | 12/2010 | Muijs ............... H04N 13/305 348/59 |
| 2012/0026161 A1* | 2/2012 | Chen ............... H04N 13/322 345/419 |
| 2012/0050341 A1 | 3/2012 | Wu et al. |
| 2013/0027873 A1 | 1/2013 | Chen et al. |
| 2013/0293547 A1 | 11/2013 | Du et al. |
| 2014/0062981 A1* | 3/2014 | Huang ............... G09G 3/3648 257/E31.127 |
| 2014/0340746 A1* | 11/2014 | Watanabe ........... G09G 3/003 359/464 |
| 2014/0347453 A1 | 11/2014 | Tanaka et al. |
| 2016/0021367 A1 | 1/2016 | Yoon et al. |
| 2016/0088280 A1 | 3/2016 | Sadi et al. |
| 2018/0181163 A1 | 6/2018 | Shin et al. |
| 2018/0247582 A1 | 8/2018 | Park et al. |
| 2018/0307269 A1 | 10/2018 | Pantel |
| 2018/0308413 A1* | 10/2018 | Jin ..................... G09G 3/3607 |
| 2019/0005898 A1* | 1/2019 | Albrecht ........... G09G 3/3426 |
| 2019/0035149 A1 | 1/2019 | Chen et al. |
| 2020/0133068 A1* | 4/2020 | Lu ..................... G02B 6/0073 |

FOREIGN PATENT DOCUMENTS

| | | |
|---|---|---|
| JP | 2015038530 A | 2/2015 |
| JP | 2017529724 A | 10/2017 |
| WO | 2011068210 A1 | 6/2011 |
| WO | 2018026503 A1 | 2/2018 |

* cited by examiner

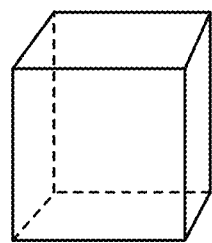 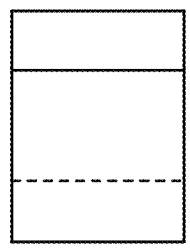 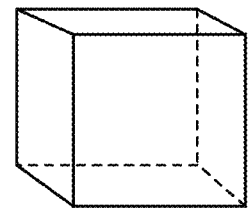
*FIG. 7A*  *FIG. 7B*  *FIG. 7C*

BOUNDARY SMOOTHING IN A DISPLAY

This application is a continuation of international patent application No. PCT/US2021/044211, filed Aug. 2, 2021, which claims priority to U.S. provisional patent application No. 63/067,252, filed Aug. 18, 2020, which are hereby incorporated by reference herein in their entireties.

FIELD

This relates generally to electronic devices, and, more particularly, to electronic devices with displays.

BACKGROUND

Electronic devices often include displays. In some cases, displays may include lenticular lenses that enable the display to provide three-dimensional content to the viewer. The lenticular lenses may be formed over an array of pixels such as organic light-emitting diode pixels or liquid crystal display pixels.

SUMMARY

An electronic device may include a lenticular display. The lenticular display may have a lenticular lens film formed over an array of pixels. A plurality of lenticular lenses may extend across the length of the display. The lenticular lenses may be configured to enable stereoscopic viewing of the display such that a viewer perceives three-dimensional images.

The display may have a number of independently controllable viewing zones. Each viewing zone displays a respective two-dimensional image. Each eye of the viewer may receive a different one of the two-dimensional images, resulting in a perceived three-dimensional image. Control circuitry in the electronic device may use the captured images from the eye and/or head tracking system to determine which viewing zones are occupied by the viewer's eyes.

The display may have an active area with a curved edge. To mitigate jaggedness in the curved edge of the active area, control circuitry may modify input pixel data for the display using dimming factors. Each brightness value of the pixel data may be multiplied by a corresponding dimming factor such that the curved edge has a smooth appearance on the display.

Each physical pixel in the display may have an associated perceived pixel that is based on an appearance of that physical pixel through the lenticular lens film. The perceived pixel may have a different footprint (e.g., with a different size and/or center) than its corresponding physical pixel. The dimming factors for boundary smoothing in the curved edges may be based on the perceived pixels.

BRIEF DESCRIPTION OF THE DRAWINGS

FIGS. 7A-7C are perspective views of illustrative three-dimensional content that may be displayed on different zones of the display of FIG. 6 in accordance with an embodiment.

DETAILED DESCRIPTION

Figure 1:
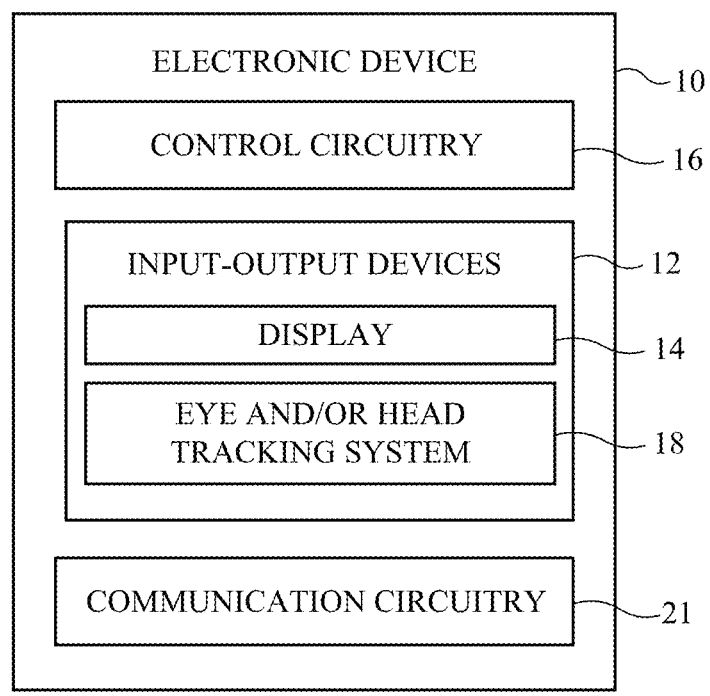
FIG. 1 is a schematic diagram of an illustrative electronic device having a display in accordance with an embodiment.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, an augmented reality (AR) headset and/or virtual reality (VR) headset, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

To support communications between device 10 and external equipment, control circuitry 16 may communicate using communications circuitry 21. Circuitry 21 may include antennas, radio-frequency transceiver circuitry, and other wireless communications circuitry and/or wired communications circuitry. Circuitry 21, which may sometimes be referred to as control circuitry and/or control and communications circuitry, may support bidirectional wireless communications between device 10 and external equipment over a wireless link (e.g., circuitry 21 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link). Wireless communications may, for example, be supported over a Bluetooth® link, a WiFi® link, a 60 GHz link or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, and other electrical components. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Some electronic devices may include two displays. In one possible arrangement, a first display may be positioned on one side of the device and a second display may be positioned on a second, opposing side of the device. The first and second displays therefore may have a back-to-back arrangement. One or both of the displays may be curved.

Sensors in input-output devices 12 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into display 14, a two-dimensional capacitive touch sensor overlapping display 14, and/or a touch sensor that forms a button, trackpad, or other input device not associated with a display), and other sensors. If desired, sensors in input-output devices 12 may include optical sensors such as optical sensors that emit and detect light, ultrasonic sensors, optical touch sensors, optical proximity sensors, and/or other touch sensors and/or proximity sensors, monochromatic and color ambient light sensors, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, depth sensors (e.g., structured light sensors and/or depth sensors based on stereo imaging devices), humidity sensors, moisture sensors, gaze tracking sensors, and/or other sensors.

Control circuitry 16 may be used to run software on device 10 such as operating system code and applications. During operation of device 10, the software running on control circuitry 16 may display images on display 14 using an array of pixels in display 14.

Display 14 may be an organic light-emitting diode display, a liquid crystal display, an electrophoretic display, an electrowetting display, a plasma display, a microelectromechanical systems display, a display having a pixel array formed from crystalline semiconductor light-emitting diode dies (sometimes referred to as microLEDs), and/or other display. Configurations in which display 14 is an organic light-emitting diode display are sometimes described herein as an example.

Display 14 may have a rectangular shape (i.e., display 14 may have a rectangular footprint and a rectangular peripheral edge that runs around the rectangular footprint) or may have other suitable shapes. Display 14 may have one or more rounded corners. Display 14 may be planar or may have a curved profile.

Device 10 may include cameras and other components that form part of gaze and/or head tracking system 18. The camera(s) or other components of system 18 may face an expected location for a viewer and may track the viewer's eyes and/or head (e.g., images and other information captured by system 18 may be analyzed by control circuitry 16 to determine the location of the viewer's eyes and/or head). This head-location information obtained by system 18 may be used to determine the appropriate direction with which display content from display 14 should be directed. Eye and/or head tracking system 18 may include any desired number/combination of infrared and/or visible light detectors. Eye and/or head tracking system 18 may optionally include light emitters to illuminate the scene.

Figure 2:
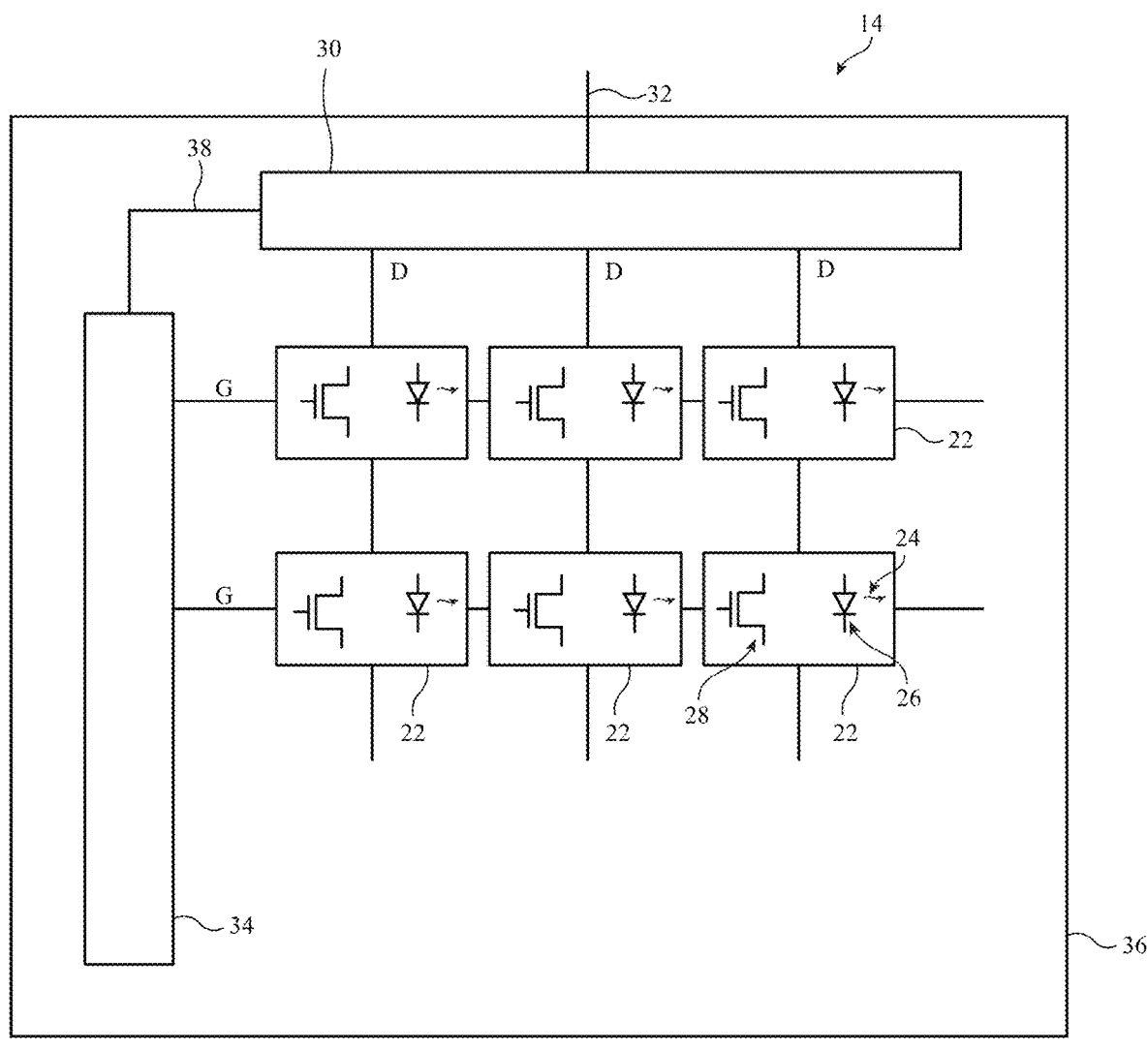
FIG. 2 is a top view of an illustrative display in an electronic device in accordance with an embodiment.

A top view of a portion of display 14 is shown in FIG. 2. As shown in FIG. 2, display 14 may have an array of pixels 22 formed on substrate 36. Substrate 36 may be formed from glass, metal, plastic, ceramic, or other substrate materials. Pixels 22 may receive data signals over signal paths such as data lines D and may receive one or more control signals over control signal paths such as horizontal control lines G (sometimes referred to as gate lines, scan lines, emission control lines, etc.). There may be any suitable number of rows and columns of pixels 22 in display 14 (e.g., tens or more, hundreds or more, or thousands or more). Each pixel 22 may have a light-emitting diode 26 that emits light 24 under the control of a pixel circuit formed from thin-film transistor circuitry (such as thin-film transistors 28 and thin-film capacitors). Thin-film transistors 28 may be polysilicon thin-film transistors, semiconducting-oxide thin-film transistors such as indium gallium zinc oxide transistors, or thin-film transistors formed from other semiconductors. Pixels 22 may contain light-emitting diodes of different colors (e.g., red, green, and blue diodes for red, green, and blue pixels, respectively) to provide display 14 with the ability to display color images.

Herein, the term pixel may encompass any independently controllable light-emitting area in the display. For example, a red light-emitting area may be referred to as a red pixel, a blue light-emitting area may be referred to as a blue pixel, and a green light-emitting area may be referred to as a green pixel. This nomenclature is merely illustrative. In some cases, a pixel may be referred to as including multiple sub-pixels (e.g., a red sub-pixel, blue sub-pixel, and green sub-pixel). Herein, the term pixel will be used throughout and may refer a red pixel, a blue, pixel, a green pixel, or a pixel of any other desired color.

Display driver circuitry may be used to control the operation of pixels 22. The display driver circuitry may be formed from integrated circuits, thin-film transistor circuits, or other suitable circuitry. Display driver circuitry 30 of FIG. 2 may contain communications circuitry for communicating with system control circuitry such as control circuitry 16 of FIG. 1 over path 32. Path 32 may be formed from traces on a flexible printed circuit or other cable. During operation, the control circuitry (e.g., control circuitry 16 of FIG. 1) may supply circuitry 30 with information on images to be displayed on display 14.

To display the images on display pixels 22, display driver circuitry 30 may supply image data to data lines D while issuing clock signals and other control signals to supporting display driver circuitry such as gate driver circuitry 34 over path 38. If desired, circuitry 30 may also supply clock signals and other control signals to gate driver circuitry on an opposing edge of display 14.

Gate driver circuitry 34 (sometimes referred to as horizontal control line control circuitry) may be implemented as part of an integrated circuit and/or may be implemented using thin-film transistor circuitry. Horizontal control lines G in display 14 may carry gate line signals (scan line signals), emission enable control signals, and other horizontal control signals for controlling the pixels of each row. There may be any suitable number of horizontal control signals per row of pixels 22 (e.g., one or more, two or more, three or more, four or more, etc.).

Display 14 may sometimes be a stereoscopic display that is configured to display three-dimensional content for a viewer. Stereoscopic displays are capable of displaying multiple two-dimensional images that are viewed from slightly different angles. When viewed together, the combination of the two-dimensional images creates the illusion of a three-dimensional image for the viewer. For example, a viewer's left eye may receive a first two-dimensional image and a viewer's right eye may receive a second, different two-dimensional image. The viewer perceives these two different two-dimensional images as a single three-dimensional image.

There are numerous ways to implement a stereoscopic display. Display 14 may be a lenticular display that uses lenticular lenses (e.g., elongated lenses that extend along parallel axes), may be a parallax barrier display that uses parallax barriers (e.g., an opaque layer with precisely spaced slits to create a sense of depth through parallax), may be a volumetric display, or may be any other desired type of stereoscopic display. Configurations in which display 14 is a lenticular display are sometimes described herein as an example.

Figure 3:
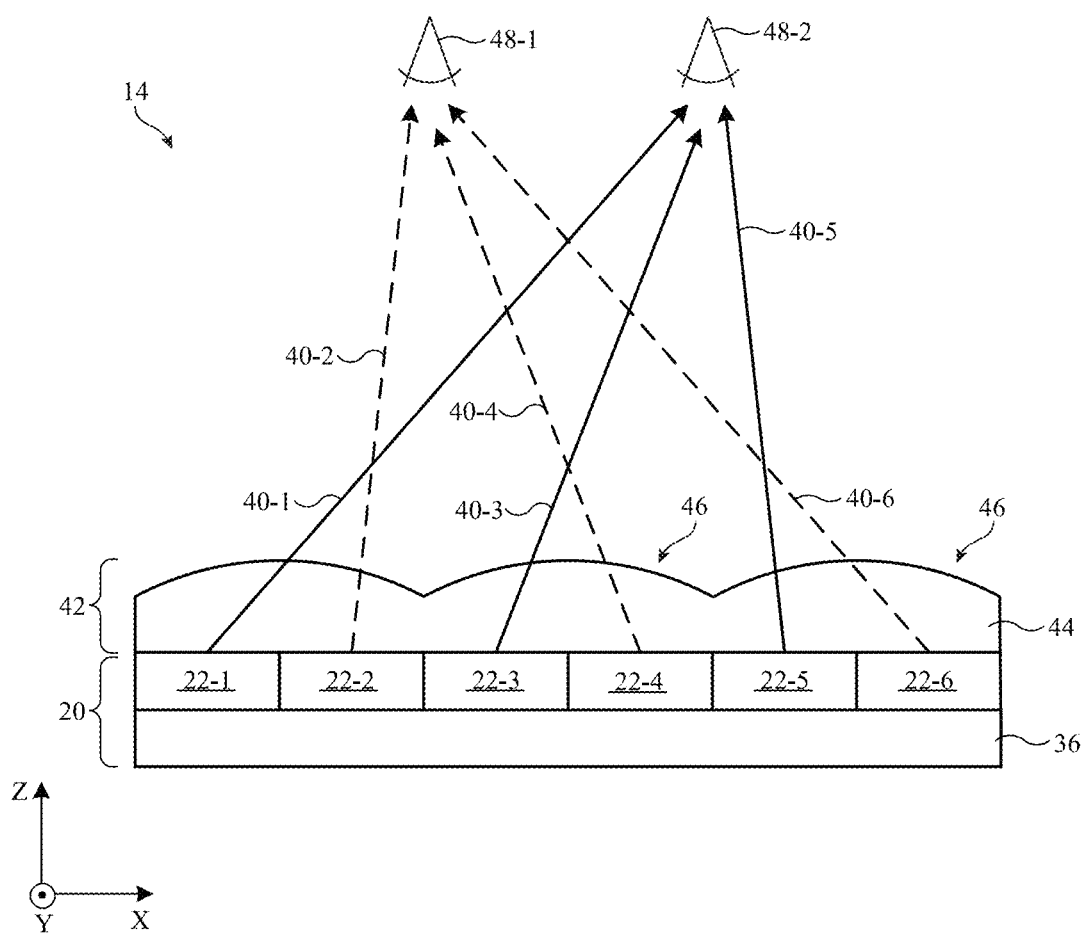
FIG. 3 is a cross-sectional side view of an illustrative lenticular display that provides images to a viewer in accordance with an embodiment.

FIG. 3 is a cross-sectional side view of an illustrative lenticular display that may be incorporated into electronic device 10. Display 14 includes a display panel 20 with pixels 22 on substrate 36. Substrate 36 may be formed from glass, metal, plastic, ceramic, or other substrate materials and pixels 22 may be organic light-emitting diode pixels, liquid crystal display pixels, or any other desired type of pixels. In FIG. 3, display panel 20 is depicted as being panel. However, display panel 20 may optionally have convex curvature (where the edges of the display panel curve in the negative Z-direction away from the center of the display panel) or concave curvature (where the edges of the display panel curve in the positive Z-direction away from the center of the display panel) if desired.

As shown in FIG. 3, lenticular lens film 42 may be formed over the display pixels. Lenticular lens film 42 (sometimes referred to as a light redirecting film, a lens film, etc.) includes lenses 46 and a base film portion 44 (e.g., a planar film portion to which lenses 46 are attached). Lenses 46 may be lenticular lenses that extend along respective longitudinal axes (e.g., axes that extend into the page parallel to the Y-axis). Lenses 46 may be referred to as lenticular elements 46, lenticular lenses 46, optical elements 46, etc.

The lenses 46 of the lenticular lens film cover the pixels of display 14. An example is shown in FIG. 3 with display pixels 22-1, 22-2, 22-3, 22-4, 22-5, and 22-6. In this example, display pixels 22-1 and 22-2 are covered by a first lenticular lens 46, display pixels 22-3 and 22-4 are covered by a second lenticular lens 46, and display pixels 22-5 and 22-6 are covered by a third lenticular lens 46. The lenticular lenses may redirect light from the display pixels to enable stereoscopic viewing of the display.

Consider the example of display 14 being viewed by a viewer with a first eye (e.g., a right eye) 48-1 and a second eye (e.g., a left eye) 48-2. Light from pixel 22-1 is directed by the lenticular lens film in direction 40-1 towards left eye 48-2, light from pixel 22-2 is directed by the lenticular lens film in direction 40-2 towards right eye 48-1, light from pixel 22-3 is directed by the lenticular lens film in direction 40-3 towards left eye 48-2, light from pixel 22-4 is directed by the lenticular lens film in direction 40-4 towards right eye 48-1, light from pixel 22-5 is directed by the lenticular lens film in direction 40-5 towards left eye 48-2, light from pixel 22-6 is directed by the lenticular lens film in direction 40-6 towards right eye 48-1. In this way, the viewer's right eye 48-1 receives images from pixels 22-2, 22-4, and 22-6, whereas left eye 48-2 receives images from pixels 22-1, 22-3, and 22-5. Pixels 22-2, 22-4, and 22-6 may be used to display a slightly different image than pixels 22-1, 22-3, and 22-5. Consequently, the viewer may perceive the received images as a single three-dimensional image.

Pixels of the same color may be covered by a respective lenticular lens 46. In one example, pixels 22-1 and 22-2 may be red pixels that emit red light, pixels 22-3 and 22-4 may be green pixels that emit green light, and pixels 22-5 and 22-6 may be blue pixels that emit blue light. This example is merely illustrative. In general, each lenticular lens may cover any desired number of pixels each having any desired color. The lenticular lens may cover a plurality of pixels having the same color, may cover a plurality of pixels each having different colors, may cover a plurality of pixels with some pixels being the same color and some pixels being different colors, etc.

Figure 4:
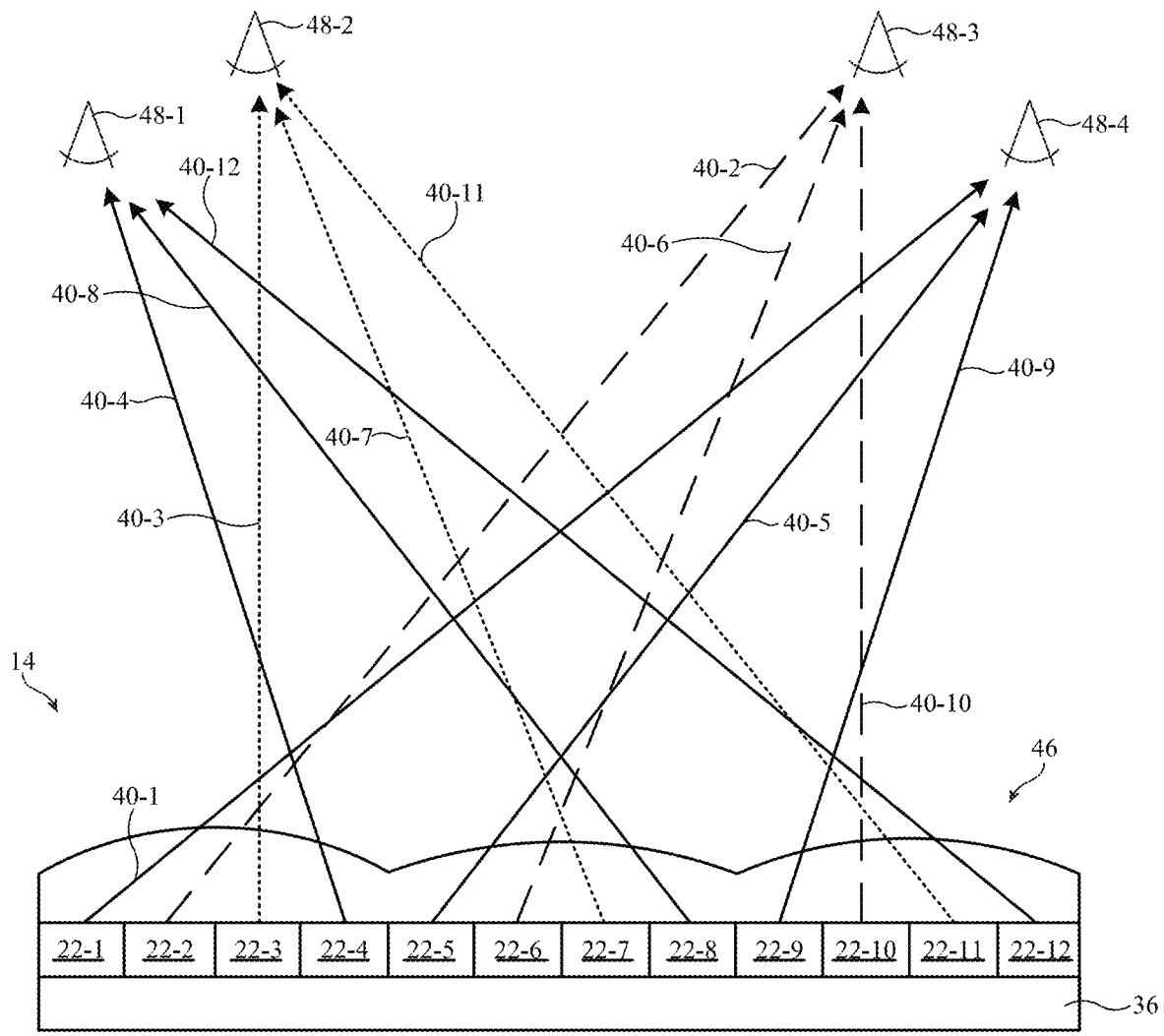
FIG. 4 is a cross-sectional side view of an illustrative lenticular display that provides images to two or more viewers in accordance with an embodiment.

FIG. 4 is a cross-sectional side view of an illustrative stereoscopic display showing how the stereoscopic display may be viewable by multiple viewers. The stereoscopic display of FIG. 3 may have one optimal viewing position (e.g., one viewing position where the images from the display are perceived as three-dimensional). The stereoscopic display of FIG. 4 may have two or more optimal viewing positions (e.g., two or more viewing positions where the images from the display are perceived as three-dimensional).

Display 14 may be viewed by both a first viewer with a right eye 48-1 and a left eye 48-2 and a second viewer with a right eye 48-3 and a left eye 48-4. Light from pixel 22-1 is directed by the lenticular lens film in direction 40-1 towards left eye 48-4, light from pixel 22-2 is directed by the lenticular lens film in direction 40-2 towards right eye 48-3, light from pixel 22-3 is directed by the lenticular lens film in direction 40-3 towards left eye 48-2, light from pixel 22-4 is directed by the lenticular lens film in direction 40-4 towards right eye 48-1, light from pixel 22-5 is directed by the lenticular lens film in direction 40-5 towards left eye 48-4, light from pixel 22-6 is directed by the lenticular lens film in direction 40-6 towards right eye 48-3, light from pixel 22-7 is directed by the lenticular lens film in direction 40-7 towards left eye 48-2, light from pixel 22-8 is directed by the lenticular lens film in direction 40-8 towards right eye 48-1, light from pixel 22-9 is directed by the lenticular lens film in direction 40-9 towards left eye 48-4, light from pixel 22-10 is directed by the lenticular lens film in direction 40-10 towards right eye 48-3, light from pixel 22-11 is directed by the lenticular lens film in direction 40-11 towards left eye 48-2, and light from pixel 22-12 is directed by the lenticular lens film in direction 40-12 towards right eye 48-1. In this way, the first viewer's right eye 48-1 receives images from pixels 22-4, 22-8, and 22-12, whereas left eye 48-2 receives images from pixels 22-3, 22-7, and 22-11. Pixels 22-4, 22-8, and 22-12 may be used to display a slightly different image than pixels 22-3, 22-7, and 22-11. Consequently, the first viewer may perceive the received images as a single three-dimensional image. Similarly, the second viewer's right eye 48-3 receives images from pixels 22-2, 22-6, and 22-10, whereas left eye 48-4 receives images from pixels 22-1, 22-5, and 22-9. Pixels 22-2, 22-6, and 22-10 may be used to display a slightly different image than pixels 22-1, 22-5, and 22-9. Consequently, the second viewer may perceive the received images as a single three-dimensional image.

Pixels of the same color may be covered by a respective lenticular lens 46. In one example, pixels 22-1, 22-2, 22-3, and 22-4 may be red pixels that emit red light, pixels 22-5, 22-6, 22-7, and 22-8 may be green pixels that emit green light, and pixels 22-9, 22-10, 22-11, and 22-12 may be blue pixels that emit blue light. This example is merely illustrative. The display may be used to present the same three-dimensional image to both viewers or may present different three-dimensional images to different viewers. In some cases, control circuitry in the electronic device 10 may use eye and/or head tracking system 18 to track the position of one or more viewers and display images on the display based on the detected position of the one or more viewers.

It should be understood that the lenticular lens shapes and directional arrows of FIGS. 3 and 4 are merely illustrative. The actual rays of light from each pixel may follow more complicated paths (e.g., with redirection occurring due to refraction, total internal reflection, etc.). Additionally, light from each pixel may be emitted over a range of angles. The lenticular display may also have lenticular lenses of any desired shape or shapes. Each lenticular lens may have a width that covers two pixels, three pixels, four pixels, more than four pixels, more than ten pixels, more than fifteen pixels, less than twenty-five pixels, etc. Each lenticular lens may have a length that extends across the entire display (e.g., parallel to columns of pixels in the display).

Figure 5:
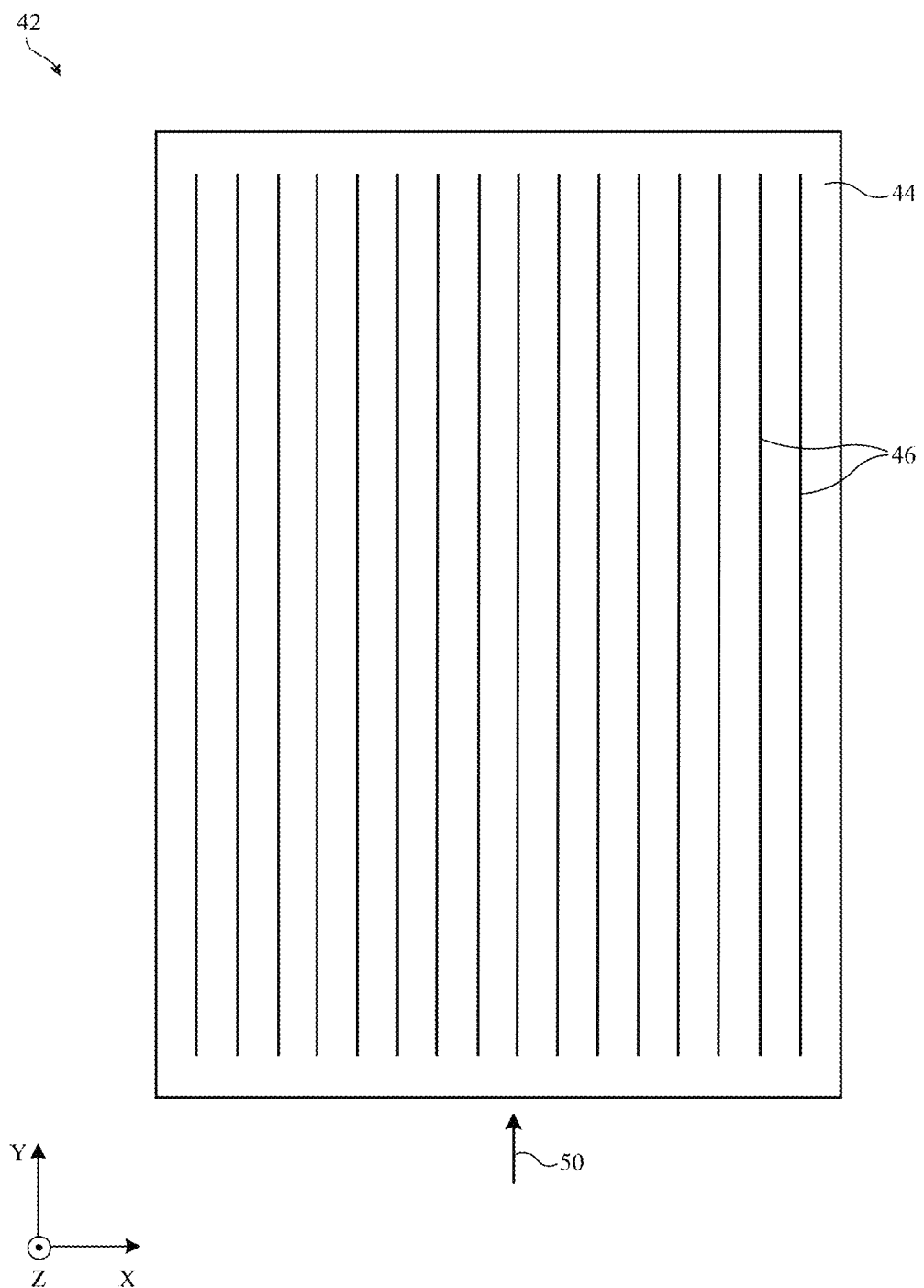
FIG. 5 is a top view of an illustrative lenticular lens film showing the elongated shape of the lenticular lenses in accordance with an embodiment.

FIG. 5 is a top view of an illustrative lenticular lens film that may be incorporated into a lenticular display. As shown in FIG. 5, elongated lenses 46 extend across the display parallel to the Y-axis. For example, the cross-sectional side view of FIGS. 3 and 4 may be taken looking in direction 50. The lenticular display may include any desired number of lenticular lenses 46 (e.g., more than 10, more than 100, more than 1,000, more than 10,000, etc.). In FIG. 5, the lenticular lenses extend perpendicular to the upper and lower edge of the display panel. This arrangement is merely illustrative, and the lenticular lenses may instead extend at a non-zero, non-perpendicular angle (e.g., diagonally) relative to the display panel if desired.

Figure 6:
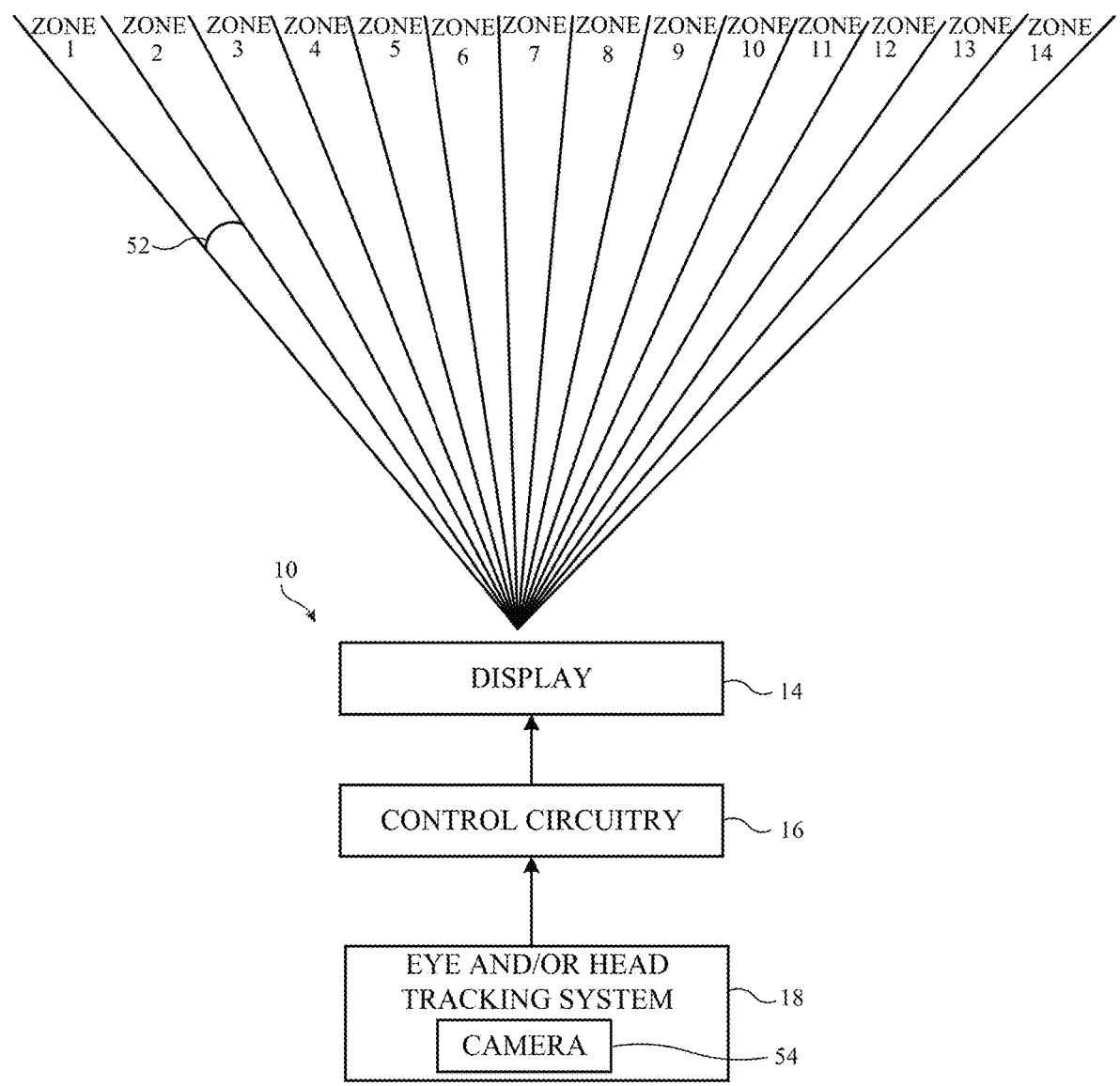
FIG. 6 is a diagram of an illustrative display that includes an eye and/or head tracking system that determines viewer eye position and control circuitry that updates the display based on the viewer eye position in accordance with an embodiment.

FIG. 6 is a schematic diagram of an illustrative electronic device showing how information from eye and/or head tracking system 18 may be used to control operation of the display. As shown in FIG. 6, display 14 is capable of providing unique images across a number of distinct zones. In FIG. 6, display 14 emits light across 14 zones, each having a respective angle of view 52. The angle 52 may be between 1° and 2°, between 0° and 4°, less than 5°, less than 3°, less than 2°, less than 1.5°, greater than 0.5°, or any other desired angle. Each zone may have the same associated viewing angle or different zones may have different associated viewing angles.

The example herein of the display having 14 independently controllable zones is merely illustrative. In general, the display may have any desired number of independently controllable zones (e.g., more than 2, more than 6, more than 10, more than 12, more than 16, more than 20, more than 30, more than 40, less than 40, between 10 and 30, between 12 and 25, etc.).

Each zone is capable of displaying a unique image to the viewer. The pixels on display 14 may be divided into groups, with each group of pixels capable of displaying an image for a particular zone. For example, a first subset of pixels in display 14 is used to display an image (e.g., a two-dimensional image) for zone 1, a second subset of pixels in display 14 is used to display an image for zone 2, a third subset of pixels in display 14 is used to display an image for zone 3, etc. In other words, the pixels in display 14 may be divided into 14 groups, with each group associated with a corresponding zone (sometimes referred to as viewing zone) and capable of displaying a unique image for that zone. The pixels groups may also themselves be referred to as zones.

Control circuitry 16 may control display 14 to display desired images in each viewing zone. There is much flexibility in how the display provides images to the different viewing zones. Display 14 may display entirely different content in different zones of the display. For example, an image of a first object (e.g., a cube) is displayed for zone 1, an image of a second, different object (e.g., a pyramid) is displayed for zone 2, an image of a third, different object (e.g., a cylinder) is displayed for zone 3, etc. This type of scheme may be used to allow different viewers to view entirely different scenes from the same display. However, in practice there may be crosstalk between the viewing zones. As an example, content intended for zone 3 may not be contained entirely within viewing zone 3 and may leak into viewing zones 2 and 4.

Therefore, in another possible use-case, display 14 may display a similar image for each viewing zone, with slight adjustments for perspective between each zone. This may be referred to as displaying the same content at different perspectives (or different views), with one image corresponding to a unique perspective of the same content. For example, consider an example where the display is used to display a three-dimensional cube. The same content (e.g., the cube) may be displayed on all of the different zones in the display. However, the image of the cube provided to each viewing zone may account for the viewing angle associated with that particular zone. In zone 1, for example, the viewing cone may be at a −10° angle relative to the surface normal of the display. Therefore, the image of the cube displayed for zone 1 may be from the perspective of a −10° angle relative to the surface normal of the cube (as in FIG. 7A). Zone 7, in contrast, is at approximately the surface normal of the display. Therefore, the image of the cube displayed for zone 7 may be from the perspective of a 0° angle relative to the surface normal of the cube (as in FIG. 7B). Zone 14 is at a 10° angle relative to the surface normal of the display. Therefore, the image of the cube displayed for zone 14 may be from the perspective of a 10° angle relative to the surface normal of the cube (as in FIG. 7C). As a viewer progresses from zone 1 to zone 14 in order, the appearance of the cube gradually changes to simulate looking at a real-world object.

There are many possible variations for how display 14 displays content for the viewing zones. In general, each viewing zone may be provided with any desired image based on the application of the electronic device. Different zones may provide different images of the same content at different perspectives, different zones may provide different images of different content, etc.

In some electronic devices, it may be desirable for display 14 to have an active area having one or more curved edges (e.g., a footprint having curved edges when viewed from an angle orthogonal to the plane of the display). The curved edge of the active area may provide a desired aesthetic appearance to the display. However, if care is not taken, a curved edge of an active area may have jagged edges.

Figure 8:
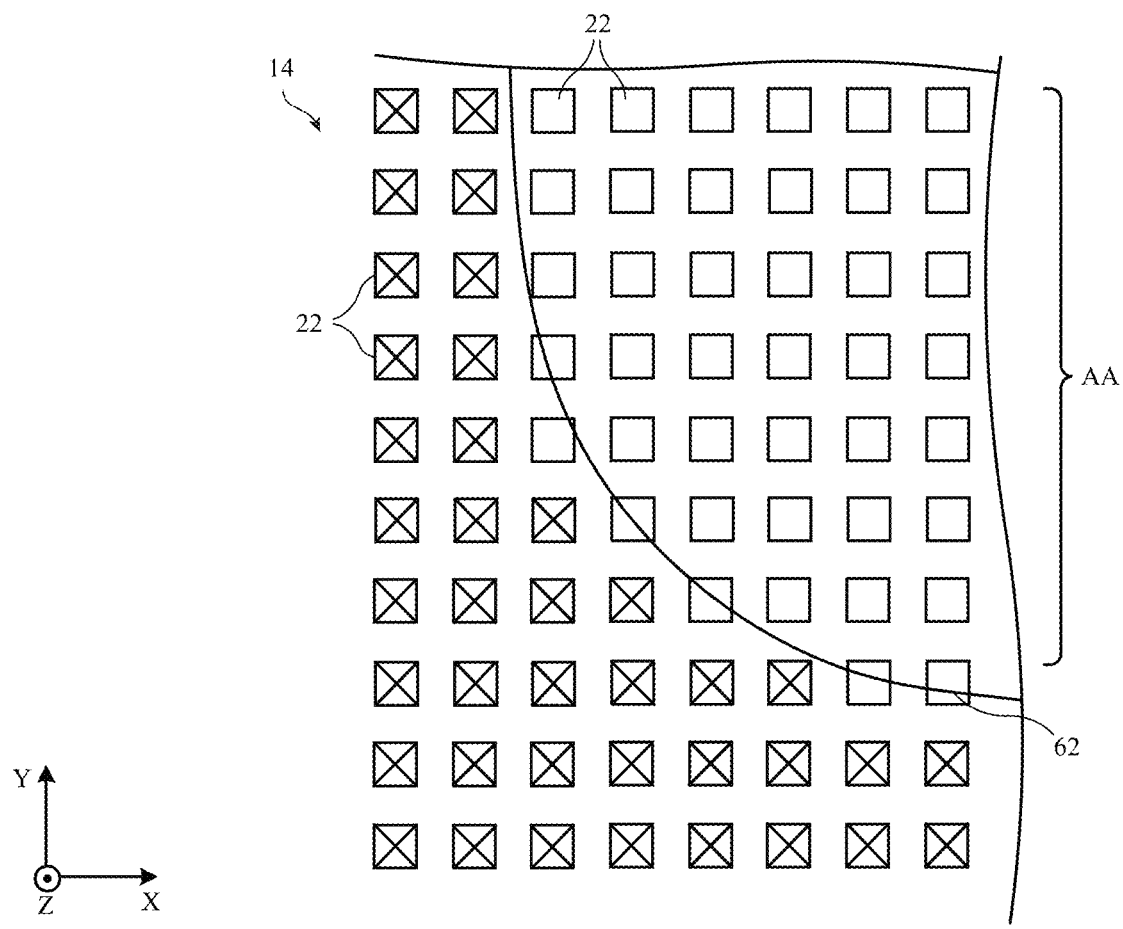
FIG. 8 is a top view of a display having an active area with a curved edge in accordance with an embodiment.

FIG. 8 is a top view of an illustrative display having an active area with a curved edge (e.g., a footprint or outline having a curved edge when viewed in a direction parallel to the Z-axis). As shown, the active area AA may have a target boundary 62. Ideally, uniform light would be emitted at all points inside the target boundary 62 and no light would be emitted at points outside of the target boundary. This would ensure that the active area displays a curve that appears smooth to a user of the electronic device. However, because individual pixels in the display may be discernable to a user, selectively enabling pixels to try to follow the target boundary (sometimes referred to as a spline, outline, etc.) may result in a curved edge that appears jagged to the user along the boundary. FIG. 8 shows jagged edges of this type.

The display may have an array of pixels, as shown in FIG. 8. Pixels outside of the target boundary 62 may not emit light to attempt to approximate the curvature of target boundary 62. In FIG. 8, pixels that do not emit light are marked with an X. This type of scheme approximates the curvature of target boundary 62. However, the pixels 22 that do emit light may have a jagged arrangement, as shown in FIG. 8.

To mitigate the jaggedness perceived by the viewer in the curved edge of the active area, boundary smoothing may be used. Boundary smoothing may involve selectively dimming some of the pixels near target boundary 62 by a dimming factor. Different pixels may have different dimming factors. The pixels may be gradually dimmed near boundary 62 to impart a smooth appearance to the curved edge of the active area.

The presence of lenticular lenses 46 over pixels 22 may complicate the boundary smoothing near the curved target boundary for the active area of the display. In particular, the perceived pixel size and location may differ than the size and location of a physical pixel on the display. FIGS. 9 and 10 illustrate this issue.

Figure 9A:
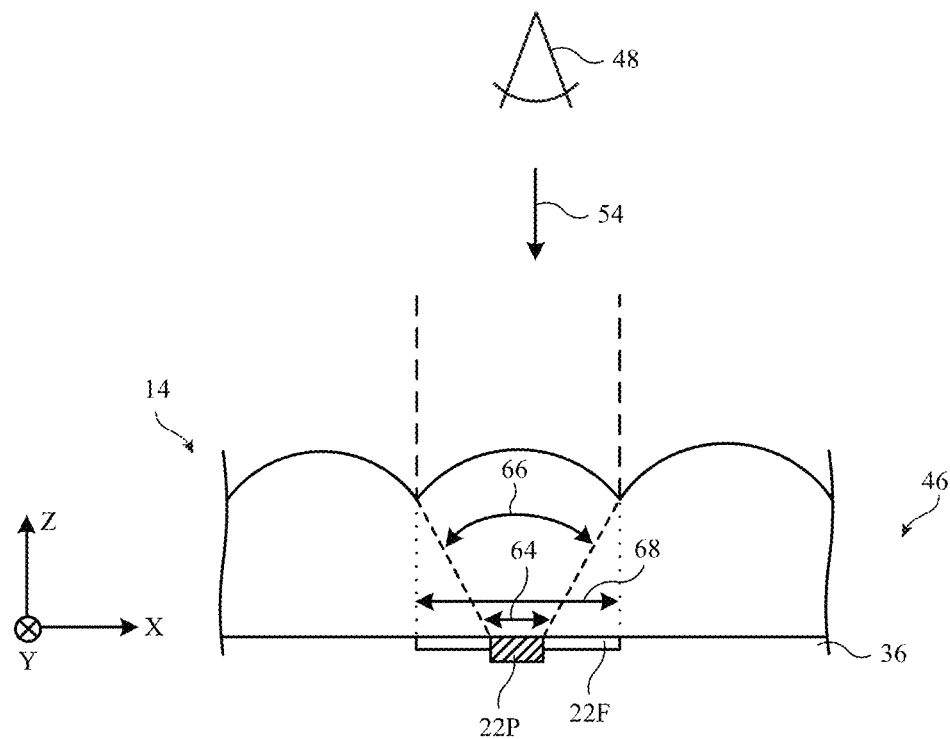
FIGS. 9A and 9B are cross-sectional and top views of a display showing how a physical pixel may have a corresponding front-of-screen pixel with a larger footprint than the physical pixel in accordance with an embodiment.

FIG. 9A is a cross-sectional side view of an illustrative display having lenticular lenses. As shown, a physical pixel 22P (e.g., a light-emitting area) is formed on substrate 36 of a display panel. Pixel 22P may emit light in the Z-direction towards viewer 48 who views the display in direction 54. Physical pixel 22P has a width 64 (e.g., in the X-dimension). However, the presence of lenticular lenses 46 changes the perceived width of the pixel when viewed by the viewer.

A lenticular lens above physical pixel 22P may focus light across an angle 66. At the surface of the lenticular lens, due to this angle, the width of the emitted light associated with physical pixel 22P is greater than the width of physical pixel 22P. For viewer 48 viewing the display in direction 54, the light from physical pixel 22P will actually appear over an area represented by front-of-screen (FOS) pixel 22F in FIG. 9A. The front-of-screen pixel 22F has a width 68 that is greater than width 64.

Figure 9B:
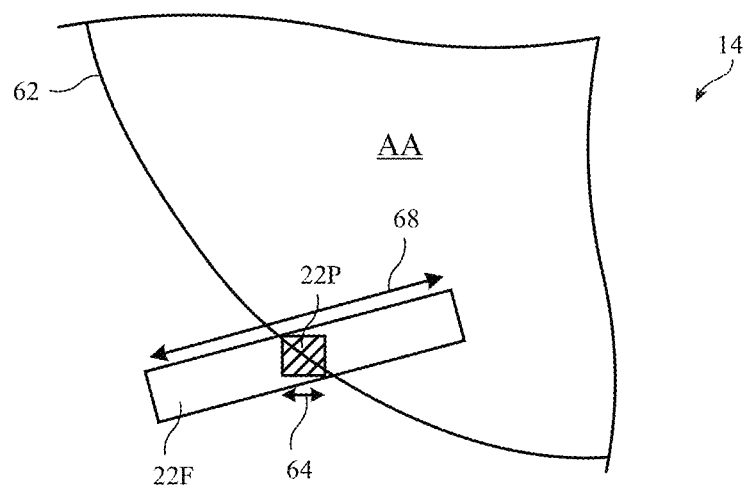

FIG. 9B is a top view of physical pixel 22P and front-of-screen pixel 22F from FIG. 9A. As shown in FIG. 9B, physical pixel 22P has a first associated surface area (footprint) with a first width 64. Front-of-screen pixel 22F has a second associated surface area (footprint) with a second width 68. As shown in FIG. 9B, the surface area (and width) of the front-of-screen pixel 22F is greater than the surface area (and width) of physical pixel 22P. This is due to the magnification of physical pixel 22P performed by lenticular lenses 46.

The front-of-screen pixel 22F refers to the illuminated area as perceived by a viewer looking at the display from the front of the display (through the lenticular lenses). The front-of-screen pixel 22F may sometimes be referred to as a perceived pixel, illuminated area, etc. Each physical pixel has an associated front-of-screen pixel 22F with a position and area that depends on the viewing angle of the viewer.

In FIG. 9B, the center of pixel 22P is approximately the same as the center of front-of-screen pixel 22F. However, this may not be the case for other physical pixels in the display.

Figure 10A:
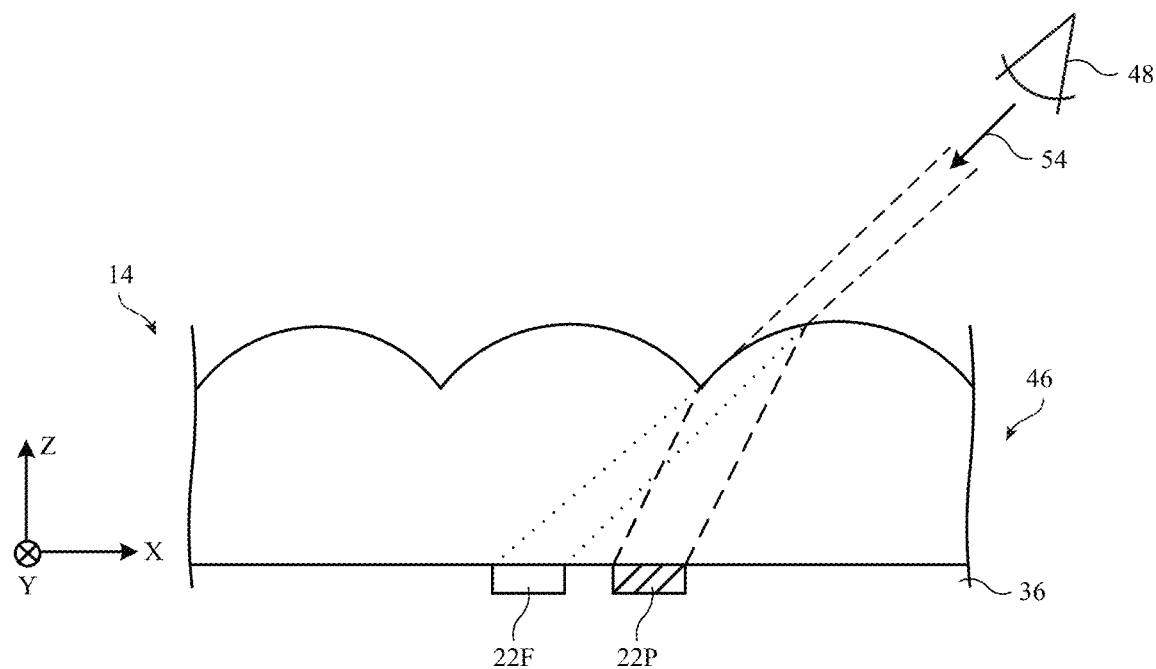
FIGS. 10A and 10B are cross-sectional and top views of a display showing how a physical pixel may have a corresponding front-of-screen pixel that is offset from the physical pixel in accordance with an embodiment.

FIG. 10A is a cross-sectional side view of an illustrative display showing another physical pixel and corresponding front-of-screen pixel. As shown, a physical pixel 22P (e.g., a light-emitting area) is formed on substrate 36. Pixel 22P may emit light towards viewer 48 who views the display in direction 54. In this example, viewer 48 is viewing the display from an off-axis angle (e.g., a non-zero angle relative to the surface normal of the display). Consequently, front-of-screen pixel 22F is shifted relative to physical pixel 22P.

Figure 10B:
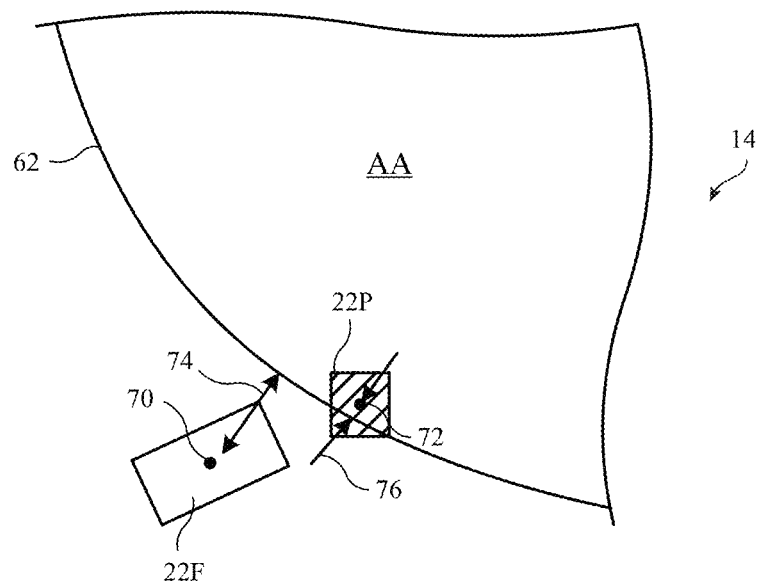

FIG. 10B is a top view of physical pixel 22P and front-of-screen pixel 22F from FIG. 10A. As shown in FIG. 10B, physical pixel 22P has a first associated surface area whereas front-of-screen pixel 22F has a second associated surface area that is different than the first surface area. In FIG. 10B, similar to FIG. 9B, the width of pixel 22F is greater than the width of pixel 22P. However, FIG. 10B additionally illustrates how the center of the front-of-screen pixel shifts relative to the center of physical pixel 22P.

In FIG. 9B, the center of physical pixel 22P is the same as the center of its corresponding front-of-screen pixel 22F. In FIG. 10B, physical pixel 22P has a center 72 and front-of-screen pixel 22F has a center 70. Center 70 is shifted relative to center 72. This is a consequence of the off-axis viewing angle of physical pixel 22P in FIGS. 10A and 10B.

The shifting of the front-of-screen pixels relative to the physical pixels at off-axis viewing angles impacts the boundary smoothing in a curved edge of the active area. As previously mentioned, boundary smoothing may rely on the position of a pixel relative to target boundary 62. Without the lenticular lenses, the physical pixel locations may be used for boundary smoothing. However, the presence of the lenticular lenses results in front-of-screen pixels 22F dictating the appearance of the display. Therefore, the locations of the front-of-screen pixels 22F may be used for boundary smoothing instead of the locations of the physical pixels.

Again looking at FIG. 10B, note that physical pixel 22P has a center 72 separated from target boundary 62 by distance 76. Front-of-screen pixel 22F has a center 70 that is separated from target boundary 62 by distance 74. Distance 74 is greater than 76. Using center 72 to calculate the dimming factor for physical pixel 22P would result in undesired error in the boundary smoothing. Instead, center 70 may be used to calculate the dimming factor for physical pixel 22P. Using the properties of the front-of-screen pixels to calculate the dimming factors for the physical pixels improves the boundary smoothing of a curved edge for the active area.

Figure 11:
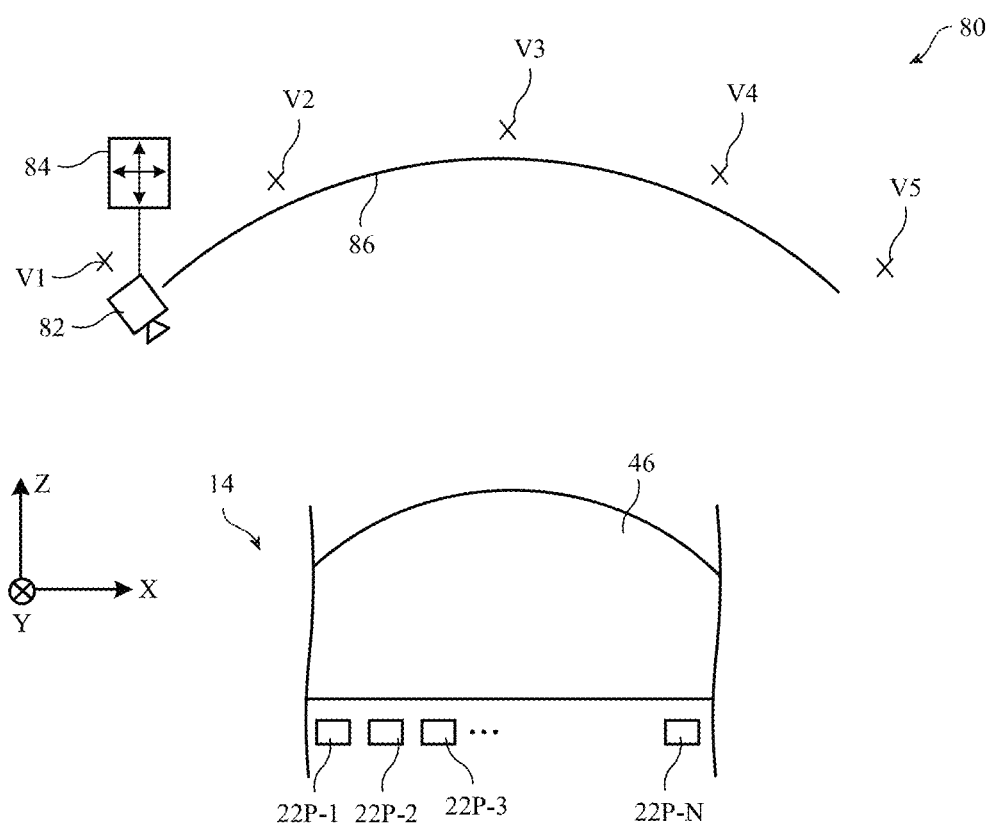
FIG. 11 is a diagram of an illustrative system that may be used to determine correlations between front-of-screen pixels and physical pixels in accordance with an embodiment.

FIG. 11 is a diagram of an illustrative system that may be used to identify a correlation between a physical pixel location and a corresponding front-of-screen pixel location. As shown in FIG. 11, system 80 includes a display 14 and a camera 82. Display 14 has a plurality of physical pixels covered by a lenticular lens 46. Camera 82 may be coupled to positioning equipment 84 (e.g., a computer-controlled positioner that can move camera 82 to desired locations).

The position of a front-of-screen pixel relative to its corresponding physical pixel is a function of the position of the physical pixel relative to the lenticular lens and the viewing angle of the viewer. The position of the physical pixel relative to the length of the lenticular lens (e.g., which runs parallel to the Y-axis in FIG. 11) may not have a significant impact on the position of the front-of-screen pixel (because the lenticular lens does not manipulate light in this dimension). Therefore, system 80 may be used to measure front-of-screen information for physical pixels at different positions along the width of the lenticular lens (e.g., which runs parallel to the X-axis in FIG. 11) and at multiple viewing angles.

Camera 82 may be positioned at a first position V1 with a first associated viewing angle. While at this position, each physical pixel across the width of lens 46 may be tested. For example, physical pixel 22P-1 may emit light. Camera 82 may capture an image of the display to determine the footprint of the front-of-screen pixel associated with physical pixel 22P-1 at the first viewing angle. Next, physical pixel 22P-2 may emit light. Camera 82 may capture an image of the display to determine the footprint of the front-of-screen pixel associated with physical pixel 22P-2 at the first viewing angle. This process may be repeated (moving across the width of the lenticular lens until all of the physical pixels under the lenticular lens are tested) at the first viewing angle. In other words, physical pixels 22P-1 through 22P-N, which extend in a line parallel to the X-axis across the width of the lenticular lens, are all tested at the first viewing angle.

After testing the pixels while at the first viewing angle, camera 82 may be positioned at the second position V2 with a second associated viewing angle. While at this position, each physical pixel under lens 46 may be tested. For example, physical pixel 22P-1 may emit light. Camera 82 may capture an image of the display to determine the footprint of the front-of-screen pixel associated with physical pixel 22P-1 at the second viewing angle. Next, physical pixel 22P-2 may emit light. Camera 82 may capture an image of the display to determine the footprint of the front-of-screen pixel associated with physical pixel 22P-2 at the second viewing angle. This process may be repeated (moving across the width of the lenticular lens until all of the physical pixels under the lenticular lens are tested) at the second viewing angle. In other words, physical pixels 22P-1 through 22P-N are all tested at the second viewing angle.

Camera 82 may be moved across a range of viewing angles (as shown by arrow 86) during testing (calibration) operations. At each viewing angle, physical pixels 22P-1 through 22P-N may be tested. Each test correlates a physical pixel location (relative to the lenticular lens) and an associated viewing angle to a front-of-screen pixel.

There may be any number of pixels (N) tested at each viewing angle. For example, N may be equal to more than three pixels, more than five pixels, more than eight pixels, more than twelve pixels, more than fifteen pixels, more than twenty pixels, more than thirty pixels, less than thirty pixels, less than twenty-five pixels, less than twenty pixels, etc.

FIG. 11 shows an example where camera 82 is positioned at five discrete positions (V1, V2, V3, V4, and V5) during testing operations. This example is merely illustrative, and tests may be obtained at any desired number of unique positions with unique viewing angles (e.g., two or more, three or more, four or more, five or more, six or more, seven or more, ten or more, fifteen or more, twenty or more, sixty or more, etc.). The difference in viewing angle between each position may be constant or may vary between different adjacent positions. In one example, each position may have a viewing angle that differs from adjacent viewing angles by 10 degrees. Other magnitudes could be used if desired (e.g., 5 degrees, 3 degrees, less than 10 degrees, more than 10 degrees, less than 3 degrees, less than 2 degrees, etc.). A test host (e.g., computing equipment) may be included to control system 80 during operation of the system.

The system of FIG. 11 may be used to build up a library of front-of-screen pixel to physical pixel correlations. Each front-of-screen pixel to physical pixel correlation has an associated viewing angle and associated location relative to an overlapping lenticular lens (e.g., centered under the lenticular lens, offset from the lenticular lens center by a given distance, etc.).

This library may be used to determine a front-of-screen pixel location for each physical pixel across a display. Each physical pixel in the display has a location relative to an overlapping lenticular lens (e.g., centered under the lenticular lens, offset from the lenticular lens center by a given distance, etc.). The location relative to the overlapping lenticular lens may be used to identify a corresponding front-of-screen pixel for that physical pixel.

The viewing angle at which a viewer views a display in real time may vary. However, at a given viewing angle the viewer may only see a subset of the physical pixels on the display (e.g., as shown in FIG. 6 with 14 separate viewing zones depicted). Said another way, a given physical pixel on the display may only be viewable at a specific, fairly narrow range of viewing angles. Therefore, each physical pixel may have an approximate known viewing angle. This known viewing angle for the physical pixel, in addition to the known location of the physical pixel relative to an overlapping lenticular lens, may be used to identify a corresponding front-of-screen pixel for the physical pixel.

Every pixel in the display may have an associated front-of-screen pixel location that is determined using the library obtained using system 80. The front-of-screen pixel locations for every pixel in the display may then be used to generate a gain table that includes dimming factors to implement boundary smoothing for a curved edge of the active area. Instead of using the position of a physical pixel to identify a dimming factor for the physical pixel, the position of the physical pixel's corresponding front-of-screen pixel is used to identify a dimming factor for the physical pixel.

During operation of the display, the dimming factors (which are based on the position of a front-of-screen pixel relative to the target boundary for the curved edge) may be applied to pixel data to implement boundary smoothing and mitigate jaggedness in curved edges of the active area.

Figure 12:
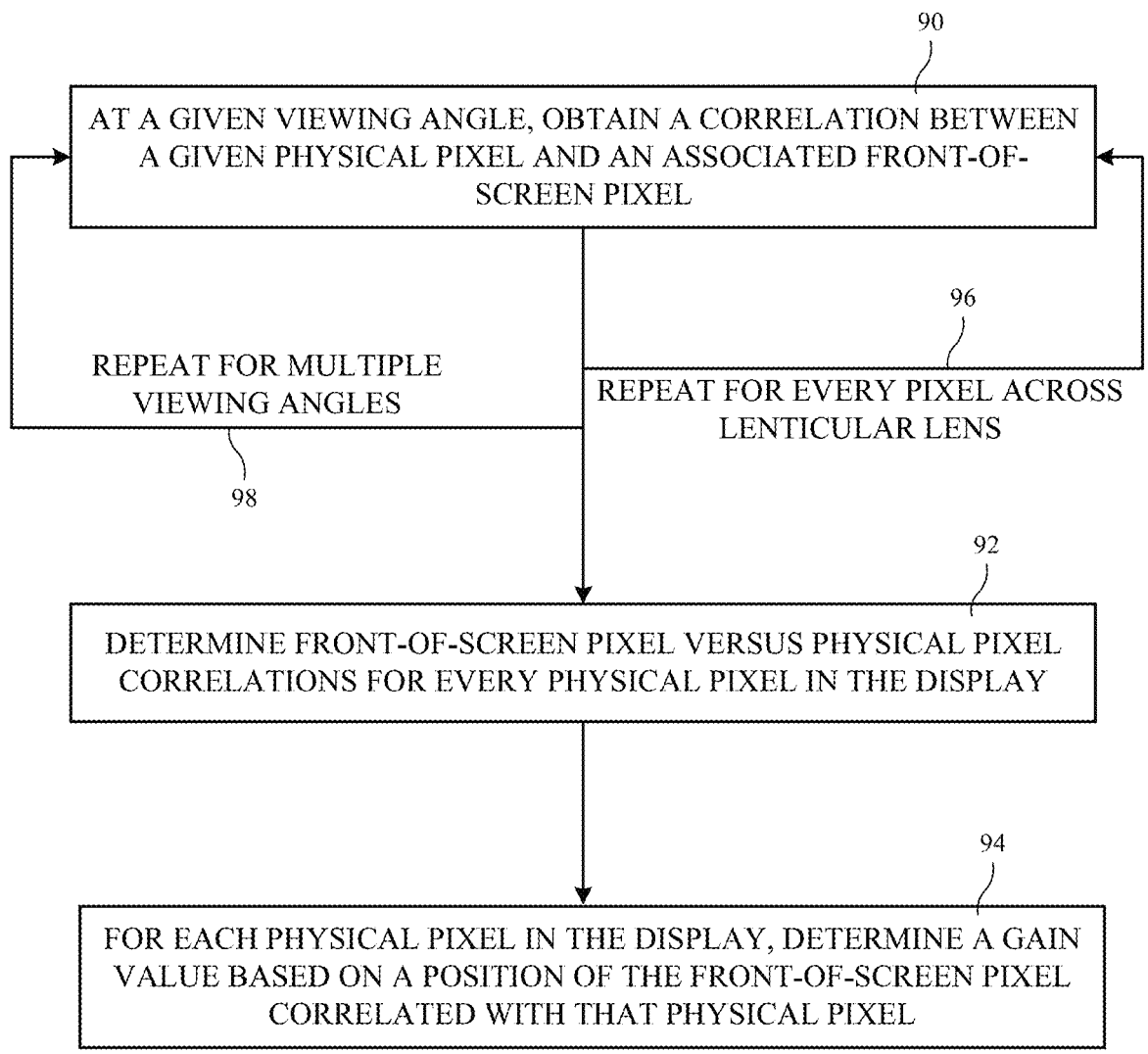
FIG. 12 is a flowchart of illustrative method steps for operating the system of FIG. 11 in accordance with an embodiment.

FIG. 12 is a flowchart of illustrative method steps for obtaining a gain table that may be used to implement boundary smoothing in a lenticular display. At step 90, at a given viewing angle, a correlation may be identified between a given physical pixel and a corresponding front-of-screen pixel (e.g., using an image captured by camera 82). Camera 82 of system 80 may be positioned at a desired viewing angle. The given physical pixel may emit light. Camera 82 may capture an image of the display to determine the location and dimensions of the front-of-screen pixel that results from the physical pixel emitting light. The correlation between the front-of-screen pixel and the physical pixel may be stored (and associated with the viewing angle of the test and the position of the physical pixel relative to the lenticular lens).

Step 90 may be repeated for every pixel across the lenticular lens (e.g., across the width of the lenticular lens as discussed in connection with FIG. 11), as indicated by loop 96. In other words, at the same viewing angle (e.g., while the camera is in the same position), the test may be repeated to obtain correlations between the front-of-screen pixel and the physical pixel for additional physical pixel locations relative to the lenticular lens.

Step 90 may also be repeated for multiple viewing angles, as indicated by loop 98. In other words, the test may be repeated while camera 82 is at different positions with different respective viewing angles to obtain correlations between the front-of-screen pixel and the physical pixel for additional viewing angles and every physical pixel location relative to the lenticular lens. After step 90 is complete (for the full combination of viewing angles and physical pixel positions relative to lenticular lens), the method may proceed to step 92.

At step 92, the front-of-screen pixel to physical pixel correlation library built up in step 90 may be used to determine a front-of-screen pixel to physical pixel correlation for every physical pixel in the active area of a given device. In other words, a particular electronic device may have a lenticular display with a unique alignment of physical pixels relative to the lenticular lenses. A front-of-screen pixel may be identified for each physical pixel in the lenticular display based on the library built at step 90. Every physical pixel in the display has an associated position relative to the lenticular lens and an associated viewing angle. The corresponding front-of-screen pixel to physical pixel correlation from the library is chosen based on the position relative to the lenticular lens and the viewing angle for the physical pixel. The viewing angle for the physical pixel may account for any curvature of the display panel (e.g., in cases where the display panel has convex curvature).

For example, a first physical pixel has a first position relative to the lenticular lens and an associated first viewing angle. A first front-of-screen pixel to physical pixel correlation from the library is chosen for the first physical pixel based on this information. The first front-of-screen pixel to physical pixel correlation is used to identify a first front-of-screen pixel for the first physical pixel. A second physical pixel has a second position relative to the lenticular lens (that is different than the first position for the first physical pixel) and the first viewing angle (e.g., the same associated viewing angle as the first physical pixel). A second front-of-screen pixel to physical pixel correlation (that is different than the first front-of-screen pixel to physical pixel correlation) from the library is chosen for the second physical pixel based on this information. The second front-of-screen pixel to physical pixel correlation is used to identify a second front-of-screen pixel for the second physical pixel. A third physical pixel has the first position relative to the lenticular lens (that is the same as the first position for the first physical pixel) and a second associated viewing angle (e.g., that is different than the first viewing angle for the first physical pixel). A third front-of-screen pixel to physical pixel correlation (that is different than the first and second front-of-screen pixel to physical pixel correlations) from the library is chosen for the third physical pixel based on this information. The third front-of-screen pixel to physical pixel correlation is used to identify a third front-of-screen pixel for the third physical pixel. A fourth physical pixel has the second position relative to the lenticular lens (that is the same as the second position for the second physical pixel) and the second viewing angle (e.g., that is the same as the second viewing angle for the third physical pixel). A fourth front-of-screen pixel to physical pixel correlation (that is different than the first, second, and third front-of-screen pixel to physical pixel correlations) from the library is chosen for the fourth physical pixel based on this information. The fourth front-of-screen pixel to physical pixel correlation is used to identify a fourth front-of-screen pixel for the fourth physical pixel.

Interpolation may be used in selecting a front-of-screen pixel to physical pixel correlation for a given physical pixel based on the library. The library may include data associated with specific intervals. For example, the library may include data at viewing angles such as 0 degrees, +10 degrees, −10 degrees, +20 degrees, −20 degrees etc. A physical pixel in the display may have an associated viewing angle of +15 degrees. In this case, interpolation may be used between the two closest entries (e.g., +10 degrees and +20 degrees) to obtain a front-of-screen pixel correlation for the physical pixel.

Similarly, the library may include data for pixels that are at specific locations relative to the lenticular lens. For example, the library may include data for pixel locations such as 0 micron off-center from the lenticular lens center, +10 microns off-center from the lenticular lens center, −10 microns off-center from the lenticular lens center, +20 microns off-center from the lenticular lens center, −20 microns off-center from the lenticular lens center, etc. A physical pixel in the display may have a location that is +15 microns off-center from the lenticular lens center. In this case, interpolation may be used between the two closest entries (e.g., +10 microns and +20 microns) to obtain a front-of-screen pixel correlation for the physical pixel.

Step 92 is complete when a full map of front-of-screen pixels is obtained for the full display of physical pixels. Next, at step 94, the front-of-screen pixels may be used to determine gain values (e.g., dimming factors) for the physical pixels of the display.

For each physical pixel in the display, an associated gain value may be determined based on the position of the front-of-screen pixel for that physical pixel. Specifically, the gain value may be used to mitigate jaggedness in a curved edge of the active area. Physical pixels having an associated front-of-screen pixel within the target boundary (e.g., a center inside the target boundary) for the active area may not be dimmed. In other words, their dimming factor may be 1 (such that an input brightness value is not modified). Physical pixels having an associated front-of-screen pixel outside the target boundary (e.g., a center outside the target boundary) for the active area may be dimmed. In other words, their dimming factor may be less than 1 (such that an input brightness value is reduced). In general, physical pixels may be more dimmed (e.g., may have a smaller gain value or dimming factor) as their front-of-screen pixels are further outside of the target boundary.

Consider a first physical pixel having a first front-of-screen pixel that is outside of the target boundary by a first distance and a second physical pixel having a second front-of-screen pixel that is outside of the target boundary by a second distance. The second distance may be greater than the first distance, resulting in a gain value for the second physical pixel being lower than a gain value for the first physical pixel. The gain value for the second physical pixel may be, for example, 0.2 (e.g., an input brightness is multiplied by 0.2) whereas the gain value for the first physical pixel may be, for example, 0.6 (e.g., an input brightness is multiplied by 0.6).

Physical pixels having an associated front-of-screen pixel that are outside the target boundary by more than a predetermined distance may be turned off entirely (e.g., their gain value may be 0). The predetermined-distance may be more than 3 microns, more than 5 microns, more than 20 microns, more than 50 microns, more than 100 microns, more than 300 microns, less than 300 microns, less than 150 microns, less than 50 microns, etc.

In general, any desired dimming factors may be used to optimize the smoothness of the curved edge of the active area. However, the dimming factors may be based on the locations and/or sizes of the front-of-screen pixels.

The front-of-screen pixel locations/sizes associated with the physical pixels of a given display (e.g., determined using steps 90 and 92 in FIG. 12) may also be used during display of content in a central portion of the active area (e.g., for anti-aliasing).

In addition to the position of the front-of-screen pixel for each physical pixel, the gain value for each physical pixel may be determined at least partially based on temperature. One or more temperature sensors (e.g., an input-output device 12) may measure a temperature associated with the display. The temperature sensors may be positioned at any desired location within the electronic device (e.g., within a housing of the electronic device, adjacent an exterior surface of the electronic device, adjacent the display panel, etc.). Due to the lenticular lenses 46 having a different (e.g., greater) coefficient of thermal expansion than the display panel, the position of the pixels relative to the lenticular lenses may vary based on the temperature of the display. Consider an example where a given physical pixel is aligned with the center of a lenticular lens at room temperature. At a second, higher temperature, the lenticular lenses across the display may expand. This expansion may cause the lenticular lenses to shift by an appreciable margin relative to the underlying physical pixels. At the second, higher temperature, the given physical pixel may no longer be aligned with the center of the lenticular lens. Accordingly, the front-of-screen pixel position for the given physical pixel is different at the second, higher temperature than at room temperature.

To account for these temperature-dependencies, steps 90-94 may be repeated while the display is at different temperatures. For example, steps 90, 92, and 94 are performed while the display is at a first temperature (e.g., room temperature) to produce a first gain table with gain values for each physical pixel in the display (at the first temperature). Steps 90, 92, and 94 are repeated while the display is at a second, different (e.g., higher) temperature to produce a second gain table with gain values for each physical pixel in the display (at the second temperature). This process may be repeated to produce gain tables at any desired number of temperatures (e.g., two, three, four, more than four, more than five, more than eight, more than ten, etc.). The gain tables may be determined for temperatures at regular intervals within an operating range of the electronic device (e.g., every 10 degrees Fahrenheit, every 5 degrees Fahrenheit, etc.).

Figure 13:
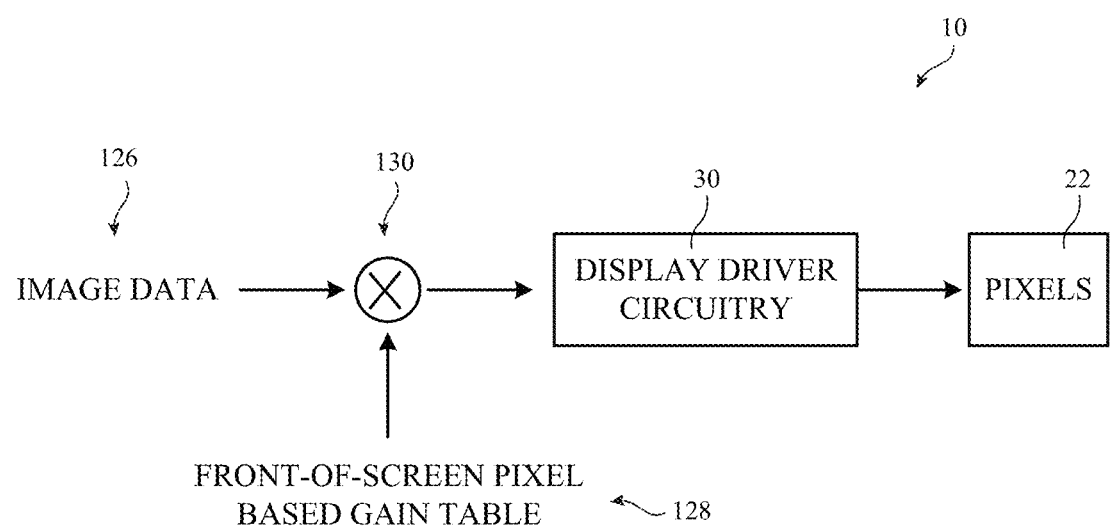
FIG. 13 is a diagram of an illustrative electronic device with a front-of-screen pixel based gain table in accordance with an embodiment.

FIG. 13 shows a schematic diagram of illustrative circuitry that may be used in implementing display 14 of device 10. During operation of electronic device 10, control circuitry in the device may supply image data 126 for images to be displayed on display 14. Ultimately, the image data may be delivered to display driver circuitry 30, which may supply the image data to data lines D of the display. Display driver circuitry 30 may also include gate driver circuitry which is used to assert gate line signals on gate lines G of display 14. The display driver circuitry may be used to provide the image data to the pixels 22 of the lenticular display.

Before being provided to display driver circuitry 30, the image data may be multiplied by dimming factors from front-of-screen pixel based gain table 128 (sometimes referred to as simply gain table 128) in multiplication circuit 130 (sometimes referred to herein as a gain circuit). Each frame of image data 126 may include a representative brightness value for each pixel 22 in the lenticular display. Gain table 128 may include a dimming factor for each pixel 22 in the lenticular display.

As discussed in connection with FIG. 12, the electronic device may store multiple discrete gain tables that are each associated with a respective temperature. Control circuitry within the electronic device may select one of the discrete gain tables to provide to multiplication circuit 130 based on the real-time temperature determined by temperature sensors within the electronic device. The control circuitry may select the gain table associated with the temperature that is closest to the real-time temperature. For example, the electronic device may store a first gain table with values associated with the display being at 60 degrees Fahrenheit, a second gain table with values associated with the display being at 70 degrees Fahrenheit, and a third gain table with values associated with the display being at 80 degrees Fahrenheit. If the real-time temperature is 72 degrees Fahrenheit, the control circuitry may select the closest gain table (in this example, the second gain table with values for 70 degrees Fahrenheit) and provide that gain table to the multiplication circuit 130.

If desired, interpolation may be used to improve the accuracy of the temperature-dependent gain values. Continuing the example above, the control circuitry may use interpolation between the second gain table (at 70 degrees Fahrenheit) and the third gain table (at 80 degrees Fahrenheit) to determine a real-time gain table with values for 72 degrees Fahrenheit. Any desired type of interpolation (e.g., linear interpolation, non-linear interpolation) or other techniques (extrapolation) may be used to determine a gain table with gain values that are based on the real-time display temperature.

Each dimming factor for a respective physical pixel in the display may be associated with the location of that physical pixel's corresponding front-of-screen pixel. For example, front-of-screen pixels outside the target boundary may have a dimming factor that is less than 1 (with a decreasing dimming factor as distance outside the target boundary increases). When the brightness level for a pixel is multiplied by a dimming factor less than 1 in gain circuit 130, the brightness of that particular pixel will be reduced (i.e. dimmed). Dimming the pixels outside the target boundary of the active area may enable the edge of the active area to appear smoother to the user.

After image data 126 is multiplied by the dimming factors from gain table 128, the modified image data may be provided to display driver circuitry 30. Display driver circuitry 30 will then provide the modified image data to the pixels 22 in the lenticular display. The lenticular display may then display the desired image with curved edges that do not appear jagged to the user.

Multiplication circuit 130, gain table 128, display driver circuitry 30, and pixels 22 as shown in FIG. 13 may sometimes be collectively referred to as display circuitry. Alternatively, pixels 22 may sometimes be referred to as a display while multiplication circuit 130, gain table 128, and display driver circuitry 30 may sometimes collectively be referred to as control circuitry.

In one example, electronic device 10 may store the library of front-of-screen pixel to physical pixel correlations in memory (e.g., in control circuitry 16). Control circuitry 16 of device 10 may optionally be used to perform steps 92 and 94 in FIG. 12 (e.g., using the library provided by system 80 that is obtained at step 90 in FIG. 12). Alternatively, one or both of steps 92 and 94 may be performed externally to device 10 (e.g., by external computing equipment). In these cases, device 10 may simply be provided with one or more gain maps (e.g., in memory) that include dimming factors that are based on front-of-screen pixel locations associated with different temperatures (e.g., as obtained at step 94 in FIG. 12).

Figure 14:
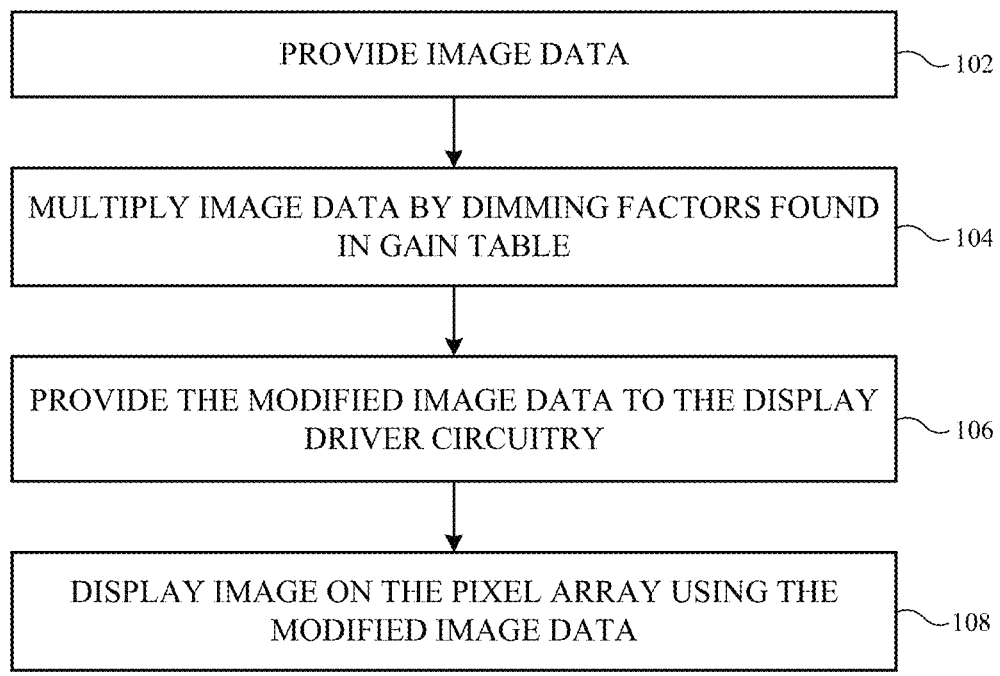
FIG. 14 is a flowchart of illustrative method steps for operating the electronic device of FIG. 13 in accordance with an embodiment.

A flowchart showing illustrative method steps for modifying image data to achieve a smoother display edge is shown in FIG. 14. As shown, at step 102 image data (i.e., image data 126) may be provided (e.g., from a graphics processing unit or other content generating circuitry). Once the image data is provided, the image data may be multiplied by dimming factors found in a gain table (i.e., gain table 128) at step 104. At step 104, the gain table may optionally be selected or determined based on the temperature of the display. Each pixel may be multiplied by a dimming factor between 0 and 1 that is associated with the location of that particular pixel's corresponding front-of-screen pixel. After the image data has been modified, the modified image data may be provided to display driver circuitry (i.e., display driver circuitry 30) at step 106. Finally, at step 108 an image may be displayed using the pixels in the pixel array based on the modified image data. Display driver circuitry 30 may supply the modified image data to pixels 22 to display the image.

The method steps shown in FIG. 14 may be applied to any type of display. Fundamentally, the method involves adjusting the brightness levels of pixels to achieve a smooth curve. This type of method may be applied to light-emitting diode (LED) displays, organic light-emitting diode (OLED) displays, liquid crystal (LC) displays, liquid crystal on silicon (LCOS) displays, etc. The displays may be reflective displays, transmissive displays, transreflective displays, or any other desired type of display. In general, any type of display may be used.

In accordance with an embodiment, an electronic device is provided that includes a display, the display includes an array of physical pixels; and a lenticular lens film formed over the array of physical pixels, each physical pixel has an associated perceived pixel based on an appearance of that physical pixel through the lenticular lens film; and control circuitry configured to: receive pixel data for the array of physical pixels; and apply dimming factors to the pixel data, the dimming factor for each physical pixel is based on the perceived pixel for that physical pixel.

In accordance with another embodiment, an active area of the display has a curved edge that follows a target boundary.

In accordance with another embodiment, the dimming factor for each physical pixel is based on a position of the perceived pixel for that physical pixel relative to the target boundary.

In accordance with another embodiment, each perceived pixel has a center and the dimming factor for each physical pixel is based on a position of the center of the perceived pixel for that physical pixel relative to the target boundary.

In accordance with another embodiment, each physical pixel has a first footprint and the perceived pixel for each physical pixel has a second footprint that is different than the first footprint.

In accordance with another embodiment, for at least some of the physical pixels, the second footprint has a larger area than the first footprint.

In accordance with another embodiment, for at least some of the physical pixels, the second footprint has a center that is shifted relative to a center of the first footprint.

In accordance with another embodiment, apply dimming factors to the pixel data includes apply dimming factors to the pixel data to obtain modified pixel data and the electronic device includes display driver circuitry configured to provide the modified pixel data to the display.

In accordance with another embodiment, applying the dimming factors to the pixel data includes multiplying a brightness value for each physical pixel by a respective dimming factor.

In accordance with another embodiment, the array of physical pixels is formed in a display panel that has convex curvature.

In accordance with another embodiment, the electronic device includes a temperature sensor configured to obtain temperature data, the dimming factor for each physical pixel is further based on the temperature data.

In accordance with an embodiment, an electronic device is provided that includes a display panel including an array of pixels; a lenticular lens film formed over the array of pixels, each pixel has a respective first footprint and each pixel has an associated front-of-screen pixel with a respective second footprint that is different than the first footprint when viewed through the lenticular lens film; and control circuitry configured to apply dimming factors to pixel data for the array of pixels, the dimming factor for each pixel is based on a position of the second footprint for the front-of-screen pixel for that pixel.

In accordance with another embodiment, the display panel is configured to emit light over an active area and the active area has a curved edge.

In accordance with another embodiment, the dimming factor for each pixel is based on a position of the second footprint relative to a target boundary for the curved edge.

In accordance with another embodiment, each second footprint has a center and the dimming factor for each pixel is based on a position of the center of the second footprint relative to a target boundary for the curved edge.

In accordance with another embodiment, for at least some of the pixels, the second footprint has a larger area than the first footprint.

In accordance with another embodiment, for at least some of the pixels, the second footprint has a center that is shifted relative to a center of the first footprint.

In accordance with another embodiment, the display panel is planar.

In accordance with another embodiment, the display panel has convex curvature.

In accordance with an embodiment, a method is provided that includes for each one of a plurality of physical pixels under a lenticular lens, using a camera to obtain correlations between the physical pixel and a respective front-of-screen pixel at a plurality of viewing angles; based on the correlations between the physical pixels and respective front-of-screen pixels, determine a front-of-screen pixel footprint for each pixel in a display; and for each pixel in the display, determine a gain value based on the front-of-screen pixel footprint for that pixel.

In accordance with another embodiment, the gain values for the pixels in the display are used to implement boundary smoothing in a curved edge of the display.

The foregoing is merely illustrative and various modifications can be made to the described embodiments. The foregoing embodiments may be implemented individually or in any combination.

What is claimed is:

1. An electronic device comprising:
a display, wherein the display comprises:
an array of physical pixels; and
a lenticular lens film formed over the array of physical pixels, wherein each physical pixel has an associated perceived pixel based on an appearance of that physical pixel through the lenticular lens film, wherein each physical pixel has a first footprint, and wherein the perceived pixel for each physical pixel has a second footprint that is different than the first footprint;
control circuitry configured to:
receive pixel data for the array of physical pixels; and
apply dimming factors to the pixel data, wherein the dimming factor for each physical pixel is based on the perceived pixel for that physical pixel.

2. The electronic device defined in claim 1, wherein an active area of the display has a curved edge that follows a target boundary.

3. The electronic device defined in claim 2, wherein the dimming factor for each physical pixel is based on a position of the illuminated area for that physical pixel relative to the target boundary.

4. The electronic device defined in claim 2, wherein each illuminated area has a center and wherein the dimming factor for each physical pixel is based on a position of the center of the illuminated area for that physical pixel relative to the target boundary.

5. The electronic device defined in claim 1, wherein, for at least some of the physical pixels, the second footprint has a larger area than the first footprint.

6. The electronic device defined in claim 1, wherein, for at least some of the physical pixels, the second footprint has a center that is shifted relative to a center of the first footprint.

7. The electronic device defined in claim 1, wherein applying the dimming factors to the pixel data comprises multiplying a brightness value for each physical pixel by a respective dimming factor.

8. The electronic device defined in claim 1, wherein the array of physical pixels is formed in a display panel that has convex curvature.

9. The electronic device defined in claim 1, further comprising:
a temperature sensor configured to obtain temperature data, wherein the dimming factor for each physical pixel is further based on the temperature data.

10. The electronic device defined in claim 1, wherein apply dimming factors to the pixel data comprises apply dimming factors to the pixel data to obtain modified pixel data and wherein the electronic device further comprises:
display driver circuitry configured to provide the modified pixel data to the display.

11. An electronic device comprising:
a display panel comprising an array of pixels;
a lenticular lens film formed over the array of pixels, wherein each pixel has a respective first footprint and has an associated front-of-screen pixel at a surface of the lenticular lens film, wherein each front-of-screen pixel has a respective second footprint, and wherein, for at least some of the pixels, the second footprint is different than the first footprint; and
control circuitry configured to apply dimming factors to pixel data for the array of pixels, wherein the dimming factor for each pixel is based on a position of the second footprint for the front-of-screen pixel for that pixel.

12. The electronic device defined in claim 11, wherein the display panel is configured to emit light over an active area and wherein the active area has a curved edge.

13. The electronic device defined in claim 12, wherein the dimming factor for each pixel is based on a position of the second footprint relative to a target boundary for the curved edge.

14. The electronic device defined in claim 12, wherein each second footprint has a center and wherein the dimming factor for each pixel is based on a position of the center of the second footprint relative to a target boundary for the curved edge.

15. The electronic device defined in claim 11, wherein, for at least some of the pixels, the second footprint has a larger area than the first footprint.

16. The electronic device defined in claim 11, wherein, for at least some of the pixels, the second footprint has a center that is shifted relative to a center of the first footprint.

17. The electronic device defined in claim 11, wherein the display panel is planar.

18. The electronic device defined in claim 11, wherein the display panel has convex curvature.

19. A method comprising:
for each one of a plurality of physical pixels under a lenticular lens, using a camera to obtain correlations between the physical pixel and a respective front-of-screen pixel at a plurality of viewing angles;

based on the correlations between the physical pixels and respective front-of-screen pixels, determining a front-of-screen pixel footprint for each pixel in a display; and for each pixel in the display, determining a gain value based on the front-of-screen pixel footprint for that pixel.

20. The method defined in claim 19, wherein the gain values for the pixels in the display are used to implement boundary smoothing in a curved edge of the display.

21. The method defined in claim 19, wherein the display has convex curvature and wherein the plurality of viewing angles accounts for the convex curvature of the display panel.

* * * * *

UNITED STATES PATENT AND TRADEMARK OFFICE
CERTIFICATE OF CORRECTION

PATENT NO. : 12,112,663 B2
APPLICATION NO. : 18/165648
DATED : October 8, 2024
INVENTOR(S) : Juan He et al.

It is certified that error appears in the above-identified patent and that said Letters Patent is hereby corrected as shown below:

In the Claims

Column 19, Lines 49-53, "perceived pixel based on an appearance of that physical pixel through the lenticular lens film, wherein each physical pixel has a first footprint, and wherein the perceived pixel for each physical pixel has a second footprint that is different than the first footprint;" should read -- illuminated area at a surface of the lenticular lens film, wherein at least one of the physical pixels has a first surface area, and wherein the associated illuminated area for the at least one physical pixel has a second surface area that is different than the first surface area; --

Column 19, Line 58, "perceived pixel" should read -- illuminated area --

Column 20, Lines 4-6, "wherein, for at least some of the physical pixels, the second footprint has a larger area than the first footprint." should read -- wherein the second surface area has a larger area than the first surface area. --

Column 20, Lines 7-10, "wherein, for at least some of the physical pixels, the second footprint has a center that is shifted relative to a center of the first footprint." should read -- wherein the second surface area has a center that is shifted relative to a center of the first surface area. --

Signed and Sealed this
Third Day of December, 2024

Katherine Kelly Vidal
*Director of the United States Patent and Trademark Office*